United States Patent Office 3,518,414
Patented June 30, 1970

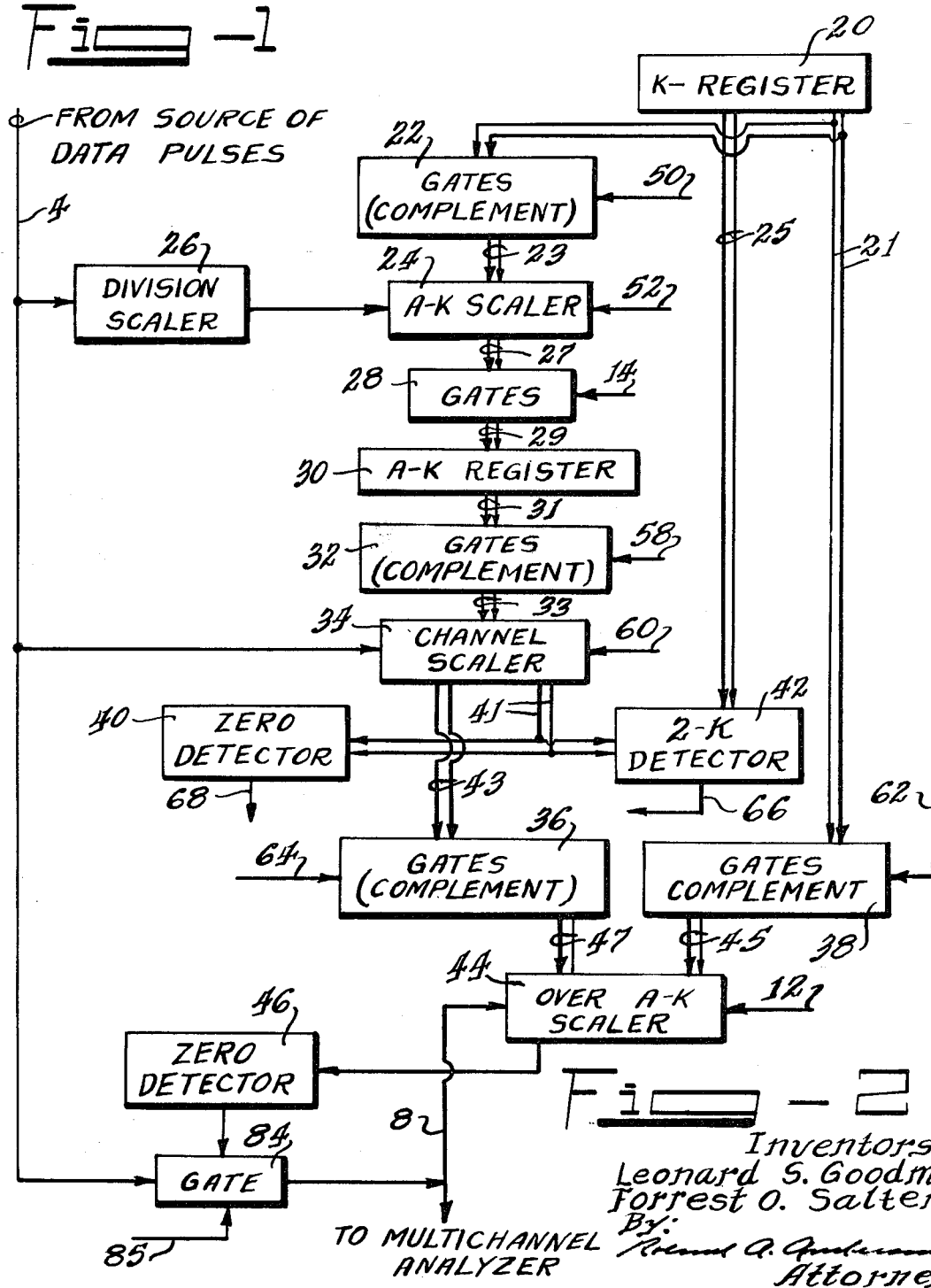

3,518,414
DIGITAL FILTER FOR SUPPRESSING NON-STATISTICAL NOISE BURSTS IN DIGITAL AVERAGING
Leonard S. Goodman, Downers Grove, and Forrest O. Salter, Glen Ellyn, Ill., assignors to the United States of America as represented by the United States Atomic Energy Commission
Filed May 31, 1967, Ser. No. 643,324
Int. Cl. G06f 7/38; H04b 15/00
U.S. Cl. 235—164                                           2 Claims

ABSTRACT OF THE DISCLOSURE

A device for suppressing fluctuations in the number of pulses in successive trains of pulses which are outside of predetermined statistically expected limits by means of a comparison circuit which detects the difference between the average number of pulses in a train of pulses during a predetermined time duration and the number of pulses in the succeeding train of pulses during the same predetermined time duration.

CONTRACTUAL ORIGIN OF THE INVENTION

The invention described herein was made in the course of, or under, a contract with the United States Atomic Energy Commission.

BACKGROUND OF THE INVENTION

This invention relates to apparatus for enhancing the signal-to-noise ratio of electrical signals embedded in noise and in particular to apparatus for suppressing large noise bursts.

Digital averaging is a useful method for enhancing the signal-to-noise ratio of a repeatedly generated signal embedded in noise, provided that the time position of such a recurring signal remains substantially constant. U.S. Pat. No. 3,087,487 issued to M. E. Clynes on Apr. 30, 1963 for "Computer of Average Response Transients" contains a description of the principles of digital averaging. By this method recurring events or signals in the presence of noise which tends to mask such events or signals are represented by recurring trains of pulses such that the number of pulses during a given time subinterval, or time channel, is proportional to the sum of the number of such events or the signal strength plus the magnitude of the associated noise. The time duration of the recurring train of pulses is subdivided into a number of equal time subintervals and the number of pulses during corresponding time subintervals of successive trains of pulses are added, thereby obtaining an improvement in the signal-to-noise ratio of the signal proportional to $\sqrt{n}$, where $n$ is the number of trains of pulses summated.

A device useful for implementing the digital averaging method is the conventional multichannel analyzer. Such a device includes a number of digital memory channels which are referenced sequentially at equally-spaced time subintervals. In successive sweeps of the multichannel analyzer, successive trains of pulses may be summated by adding and storing the number of pulses in corresponding time subintervals of each train of pulses in the same memory channels.

A common application of such a multichannel analyzer consists in the determination of the net counting rates due to a source of a particle detector, such as an ion detector of a mass spectrometer, during a given time interval, in the presence of a background rate $b \gg s$. The signal-to-noise ratio R of such a counting signal can be written as $$R = st/(bt)^{1/2}$$

In principle, any desired R can be achieved by letting the time $t$ become large enough. For example, if $b=10^6$ c.p.s., $s/b=10^{-4}$, and one desires $R=10$, then $10^4$ seconds must be spent collecting pulses in the given time interval. In this example, the calculation was made under the assumption that the only noise present arose from the usual statistical fluctuations in counting random events. In practice, there may be other sources of noise. For example, in counting ions produced by an electron-bombardment source of a mass spectrometer, the ions associated with momentary fluctuations in the pressure of the residual gas may cause large noise bursts which last for a short time interval. Such single bursts can easily obscure or confuse data that has been averaged over many sweeps of the multichannel analyzer.

It is therefore the broad object of the invention to provide an improved digital averaging system or apparatus especially adapted for use in the presence of noise of a non-statistical nature.

It is a more specific object of this invention to provide means for recognizing and suppressing fluctuations in the number of pulses in a train of pulses during a given time subinterval that are outside of predetermined statistically expected limits.

SUMMARY OF THE INVENTION

In accordance with the invention, trains of pulses which have equal time durations are each subdivided into a predetermined number of time subintervals, or time channels. During the time duration of each train of pulses, the average number of pulses A per time channel is determined and stored. For each train of pulses, the number of pulses, $C_j$, accumulated during each time channel $j$, is compared with the average number of pulses A per time channel of the preceding train of pulses. In particular, if $C_j$ falls within the range $A \pm K$, where K is a predetermined number equal to an acceptable limit of fluctuations in successive train of pulses, the number $C_j - (A-K)$ is generated during time channel $j$; if $C_j$ is outside of the range $A \pm K$, the number K is generated during time channel $j$.

BRIEF DESCRIPTION OF THE DRAWINGS

A more complete understanding of the invention will best be obtained from consideration of the accompanying drawings in which:

FIG. 1 is a block diagram illustrating how the apparatus of this invention is incorporated into a digital averaging system;

FIG. 2 is a block diagram illustrating the counter system for the apparatus of the invention.

PREFERRED EMBODIMENT OF THE INVENTION

Figure 3:
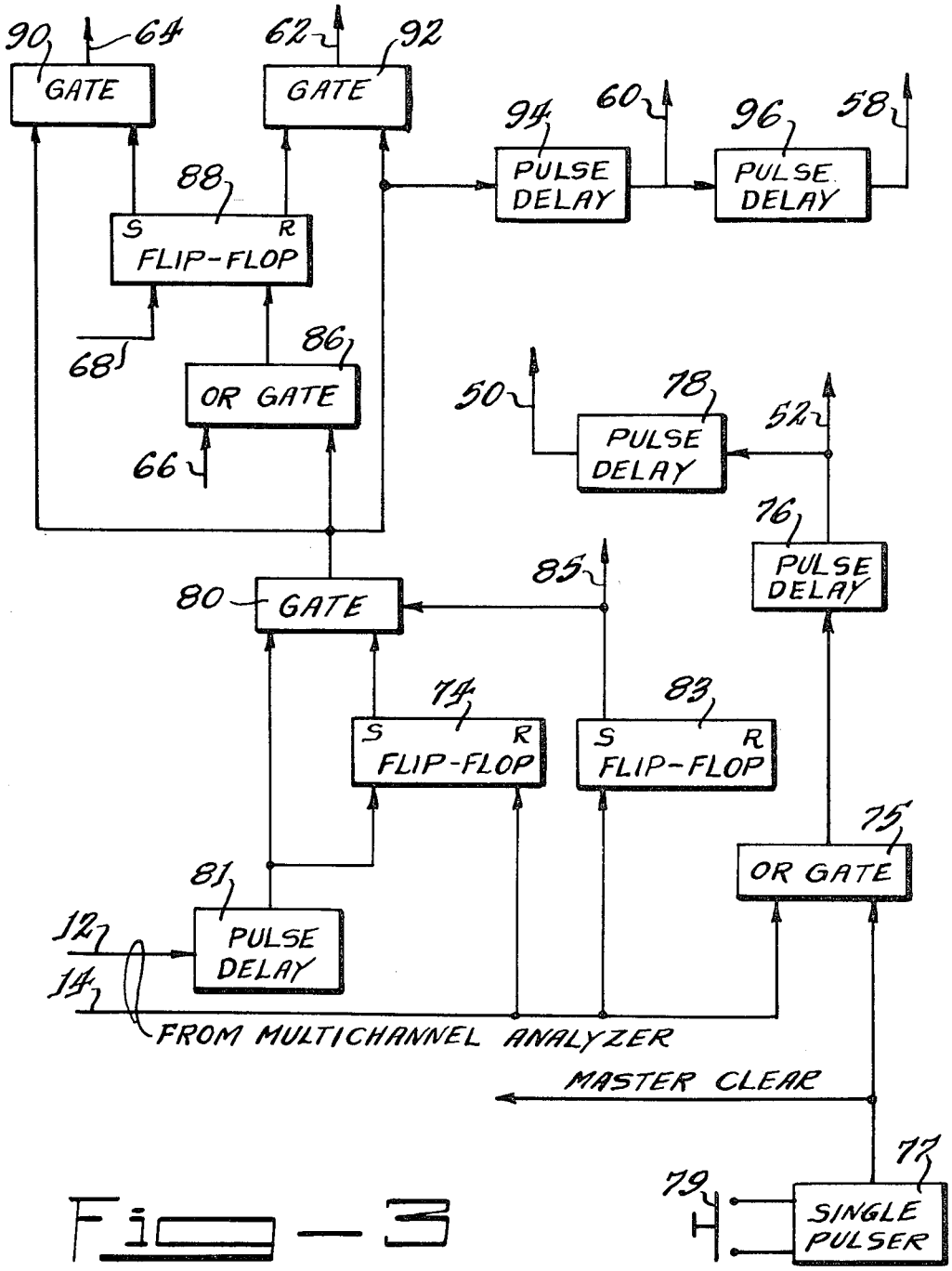
FIG. 3 is a block diagram illustrating the essential parts of the control circuitry of the apparatus of the invention.

Referring to FIG. 1, successive trains of data pulses, each representing a repeatedly generated signal and associated noise from a source of data pulses 2, are fed, via line 4, to the input of a digital filter 6 which comprises the apparatus of the present invention. Output pulses of the digital filter 6 are fed to the input of a conventional multichannel analyzer 10 via line 8.

The source of data pulses 2 represents a device, such as a mass spectrometer, which generates a train of data pulses representing a signal having a small signal-to-noise ratio and containing large non-statistical noise bursts. The source of data pulses 2 further includes suitable control circuitry to operate the device in response to control pulses from the multichannel analyzer 10.

Multichannel analyzer 10 includes N memory channels or storage registers which are referenced sequentially under control of an internal clock pulse generator which issues N equally-spaced clock pulses defining N time subintervals, or channels. A sequential reference of all memory channels starting at memory channel 1 and terminating at memory channel N is referred to hereinafter as a sweep. The frequency of the internal clock pulse generator is manually adjusted such that a sweep coincides with the time duration of each train of pulses on line 4. Each time a particular memory channel is referenced, output pulses from the digital filter 6 are added to the contents of that memory channel. The clock pulses from the internal clock pulse generator are fed, via line 12, to the control circuitry in the source of data pulses 2 to start generation of data pulses in response to the first clock pulse in a sweep of N clock pulses. The clock pulses from the internal clock pulse generator are also fed, via line 12, to the digital filter 6 to initiate the transfer of output pulses of the digital filter 6 to the multichannel analyzer 10. The multichannel analyzer 10 issues an end-of-sweep pulse after the last or N-th memory channel has been referenced and output pulses from the digital filter 6 have been added to the contents of that memory channel. The end-of-sweep pulse is fed, via line 14, to control circuitry in the digital filter 6 and to the source of data pulses 2 to terminate the generation and transfer of data pulses.

Multichannel analyzer 10 further includes a start switch and a stop switch to control the generation of clock pulses by the internal clock pulse generator.

Reference is now made to FIG. 2 for a detailed description of the counter system of the digital filter 6 of FIG. 1. In FIG. 2 double lines interconnecting the various scaler, register, and gate structures denote parallel transfer of data. Thus, double lines 21, 23, 25, 27, 29, 31, 33, 41, 43, 45 and 47 represent the required number of lines for parallel transfer of data between the respective multistage structures. Single lines connected to the multistage structures denote serial data input/output or control pulse input/output. K register 20 is a conventional seven-stage flip-flop register which may be manually set to any desired number K between 0 and $2^7-1$. Division scaler 26 is a conventional nine-stage flip-flop counter receiving data pulses from the output of the source of data pulses 2 in FIG. 1, via line 4, and which generates one output pulse in response to N data pulses, where N is equal to the number of memory channels of the multichannel analyzer 10 of FIG. 1. $A-K$ scaler 24 is a conventional eighteen-stage flip-flop counter receiving the output pulses from the division scaler 26. Seven output lines 21 connect the set or "one" output of each of the seven stages of the K register 20 to seven input gates 22. Seven output lines 23 connect the output of each of the seven input gates 22 to a toggle input of the seven lower order stages of the $A-K$ scaler 24.

$A-K$ register 30 is a conventional eighteen-stage flip-flop register. Thirty-six output lines 27 connect the set and reset outputs of each of the eighteen stages of the $A-K$ scaler 24 to thirty-six input gates 28. Thirty-six output lines 29 connect the output of each of the thirty-six input gates 28 to the set and reset inputs of the eighteen stages of $A-K$ register 30.

Channel scaler 34 is a conventional nineteen stage flip-flop counter receiving data pulses from the output of the source of data pulses 2 in FIG. 1, via line 4. Eighteen output lines 31 connect the set or "one" output of each of the eighteen flip-flop stages of the $A-K$ register 30 to eighteen input gates 32. Eighteen output lines 33 connect the output of each of the eighteen gates 32 to a toggle input of the eighteen lower order stages of the channel scaler 34.

A conventional zero detector 40 includes a matrix of AND gates having their inputs connected to the binary outputs 41 of the channel scaler 34 such that zero detector 40 issues a pulse on line 68 when the contents of channel scaler 34 reaches the number zero. A conventional 2K detector 42 includes a matrix of AND gates having their inputs connected to the binary outputs 41 of the channel scaler 34 and the binary outputs 25 of the K register 20 such that 2K detector 42 issues a pulse on line 66 when the contents of the channel scaler 34 reaches the number 2K.

Over $A-K$ scaler 44 is a nine-stage flip-flop counter having its input connected to the output of a gate 84. Eight output lines 43 connect the set or "one" output of each of the lower eight flip-flop stages of the channel scaler 34 to eight input gates 36. Eight output lines 47 connect the output of each of the eight input gates 36 to a first toggle input of the lower order stages of the Over $A-K$ scaler 44. The seven output lines 21 connect the set or "one" output of each of the seven stages of the K register 20 to seven input gates 38. Seven output lines 45 connect the output of each of the seven input gates 38 to a second toggle input of the seven lower order stages of the Over $A-K$ scaler 44.

A zero detector 46 includes a coincidence circuit having its inputs connected to the binary output of the Over $A-K$ scaler 44. The output of the zero detector 46 is connected to a first input of gate 84 and supplies an enable output level to the gate 84 when the Over $A-K$ scaler 44 contains a number different from zero; the gate 84 is thus disabled when the Over $A-K$ scaler 44 contains the number zero. A second input of the gate 84 is connected to the output of the source of data pulses 2 in FIG. 1, via line 4. A third input of the gate 84 is connected, via line 85, to the set output of a flip-flop 83 in FIG. 3. The pulse output of the gate 84, which occurs in response to time coincidence of the enabling output level of the zero detector 46, the set state of the flip-flop 83 in FIG. 3, and a data pulse on line 4, is fed to the input of the Over $A-K$ scaler 44 and, via line 8, to the input of the multichannel analyzer.

In FIG. 3 there is shown the control logic for the counter system illustrated in FIG. 2. The end-of-sweep pulse from the multichannel analyzer 10 in FIG. 1 is fed, via line 14, to the reset input of a flip-flop 74, the set input of the flip-flip 83, and a first input of an OR gate 75. A second input to the OR gate 75 is connected to the output of a conventional single pulser 77 which provides an output pulse each time contacter 79 is actuated. The pulse output of the single pulser is also fed (not shown) to the reset input of all flip-flops, scalers, and registers (except K register 20) shown in FIG. 2 and FIG. 3. The pulse output of the OR gate 75 is fed to the input of a conventional pulse delay 76. The pulse output of the pulse delay 76 is fed to the input of a conventional pulse delay 78 and, via line, 52 to the set input of each stage of the $A-K$ scaler 24 in FIG. 2. The pulse output of the pulse delay 78 is fed, via line 50, to each gate of the input gates 22 in FIG. 2.

Clock pulses from multichannel analyzer 10 in FIG. 1 are fed, via line 12, to the input of a conventional pulse delay 81 and to the set input of each stage of the Over $A-K$ scaler 44 in FIG. 2. The pulse output of the pulse delay 81 is fed to the set input of a flip-flop 74 and to a first input of a gate 80. The set output of the flip-flop 74 is connected to a second input of the gate 80. A third input of the gate 80 is connected to the set output of the flip-flop 83. The pulse output of the gate 80, which occurs in response to time coincidence of the set state of the flip-flop 74, the set state of the flip-flop 83, and an output pulse of the pulse delay 81, is fed to the input of a conventional pulse delay 94, a first input to an OR gate 86, and to a first input of each of gates 90 and 92. Second inputs of gats 90 and 92 are connected to the set and reset output, respectively, of a flip-flop 88. The pulse output of the gate 90, which occurs in response to time coincidence of the set state of the flip-flop 88 and an output pulse of the gate 80, is fed, via line 64, to each gate of input gates 36 in FIG. 2. The pulse output of the gate 92, which occurs in response to time coincidence of the reset state of the flip-flop 88 and an output pulse of the gate 80, is fed, via line 62, to each gate of input gates 38 in FIG. 2. The pulse outputs of the zero detector 40 and the 2K detector 42 in FIG. 2 are fed to the set and reset input of the flip-flop 88 in FIG. 3, respectively, via line 68 and line 66 via the OR gate 86. The pulse output of the pulse delay 94 is fed to the input of a conventional pulse delay 96 and, via line 60, to the set input of each stage of the channel scaler 34 in FIG. 2. The pulse output of the pulse delay 96 is fed, via line 58, to each gate of input gates 32 in FIG. 2.

Before operation, a number K representing the predetermined acceptable limit of fluctuations in the number of data pulses between successive multi-channel analyzer clock pulses is chosen and manually inserted in the K register 20 in FIG. 2. The single pulser 77 in FIG. 3 is actuated to produce a master clear pulse which triggers the pulse delay 76, via the OR gate 75, and resets and clears all flip-flops, scalers, and registers (except K register 20), in FIG. 2 and FIG. 3. The pulse delay 76 in FIG. 3 has a delay period sufficient to permit undesirable transients to die down. At the end of the delay period the output pulse of the pulse delay 76 sets each stage of the $A-K$ scaler 24 in FIG. 2 via line 52 and triggers the pulse delay 78 in FIG. 3.

Hereinafter in this description, when the most significant or highest order stage of a scaler is in the set or "one" state, the binary number stored in the scaler will be considered to be a negative number and counting in the scaler will be deemed to proceed from the negative number towards a positive number.

The output pulse of the pulse delay 78 in FIG. 3 gates the binary complement of K, or $-K$, to the $A-K$ scaler 24 in FIG. 2 by way of gate 22. Finally, the start switch in the multichannel analyzer 10 in FIG. 1 is actuated to start the generation of clock pulses.

In operation, the source of data pulses 2 in FIG. 1 starts generation of the first train of data pulses in response to the first clock pulse from the multichannel analyzer 10. Data pulses of the first train of data pulses on line 4 in FIG. 2 are applied to the input of the division scaler which divides the number of data pulses in the first train of data pulses by the number N, thereby generating the average number of data pulses A per time channel during the first sweep. The output pulses of the division scaler 26 are added by the $A-K$ scaler 24, which initially contains the number $-K$, to form the number $A-K$.

During the first sweep the flip-flop 83 in FIG. 3 remains in the reset state. Therefore the gate 84 in FIG. 2 is disabled and no pulses are stored in the multichannel analyzer. Control signals generated in the control logic of FIG. 3 in response to clock pulses are not utilized during the first sweep.

After the first sweep, the multichannel analyzer 10 issues an end-of-sweep pulse, via line 14 in FIG. 1, which terminates the generation of the first train of data pulses in the source of data pulses 2. The end-of-sweep pulse is also applied, via line 14, to each gate of the input gates 28 in FIG. 2 thereby transferring the number $A-K$ to the $A-K$ register 30. In the control logic of FIG. 3 the end-of-sweep pulse resets the flip-flop 74, sets the flip-flop 83, and triggers the pulse delay 76 via the OR gate 75. The output pulse of the pulse delay 76 and the output pulse of the pulse delay 78 effect the transfer of $-K$ to the $A-K$ scaler 24 in FIG. 2 as hereinbefore described.

The first clock pulse of the next sweep starts the generation of the second train of data pulses in the source of data pulses 2 in FIG. 1. The first clock pulse inserts all ones in the Over $A-K$ scaler 44 in FIG. 2 and triggers the pulse delay 81 in FIG. 3. The trailing edge of the output pulse of the pulse delay 81 sets the flip-flop 74 thereby enabling the gate 80.

The first data pulse of the second train of data pulses passes the gate 84 in FIG. 2 since the flip-flop 83 in FIG. 3 is set and the number in the Over $A-K$ scaler is not zero.

The pulse output of the gate 84 is fed, via line 8, to the multichannel analyzer where it is recorded in memory channel one. The output pulse of the gate 84 also advances the Over $A-K$ scaler 44 to the number zero, since it previously contained all "ones," thereby disabling the gate 84 via the zero detector 46. Therefore only one pulse is recorded in memory channel one of the multichannel analyzer during the first time channel.

The second clock pulse again inserts all ones in the Over $A-K$ scaler 44 in FIG. 2 and triggers the pulse delay 81 in FIG. 3. The output pulse of the pulse delay 81 passes the gate 80 since this gate is now enabled by the set outputs of flip-flops 74 and 83. Assuming for the moment that the flip-flop 88 is in the reset state, the output pulse of the gate 80 passes the gate 92 and gates, via line 62, the binary complement of K, or $-K$, to the Over $A-K$ scaler 44 in FIG. 2. During the second time channel, K pulses will therefore pass through the gate 84 in FIG. 2 and K pulses will be stored in memory channel two of the multichannel analyzer.

The pulse output of the gate 80 in FIG. 3 also triggers the pulse delay 94. The output pulse of the pulse delay 94 triggers the pulse delay 96 and inserts all ones in the channel scaler 34 in FIG. 2, via line 60. The output pulse of the pulse delay 96 in FIG. 3 transfers, via line 58, the binary complement of the $A-K$ register 30 in FIG. 2, which contains the number $A-K$ accumulated from the previous train of data pulses, to the channel scaler 34. Therefore, at the start of each time channel, except time channel one, the number $-(A-K)$ is inserted in the channel scaler 34.

During each succeeding time channel $j$ the number of data pulses $C_j$ on line 4 are applied to the input of the channel scaler 34 and are accumulatd to advance the contents of this scaler towards zero. When the contents of the channel scaler 34 reaches zero, which indicates that the number of data pulses $C_j$ in the time channel $j$ exceeds the lower limit $A-K$, the zero detector 40 generates an output pulse which sets the flip-flop 88 in FIG. 3, via line 68, thereby enabling the gate 90 and disabling the gate 92. Reaching zero and not subsequently 2K indicates that $C_j$ is within $A \pm K$ and is therefore useful. Since the gate 90 in FIG. 3 is enabled, the succeeding clock pulse passes the gate 90, via the pulse delay 81 and the gate 80, and gates, via line 64, the binary complement of $C_j-(A-K)$ in the channel scaler 34 in FIG. 2 to the Over $A-K$ scaler 44. During the succeeding time channel, $C_j-(A-K)$ is stored in the multichannel analyzer. It is thus apparent that the number of data pulses accumulated in time channel $j$ are stored in memory channel $j+1$ of the multichannel analyzer. The data pulses accumulated in the last or N-th time channel of a sweep are not stored in the multichannel analyzer.

If the number of pulses $C_j$ during time channel $j$ is not within $A \pm K$, the flip-flop 88 in FIG. 3 is in the reset state at the end of the time channel $j$, thereby enabling the gate 92 and disabling the gate 90. The succeeding clock pulse therefore passes the gate 92, via the pulse delay 81 and the gate 80, and gates, via lines 62, the binary complement of K, or $-K$, to the Over $A-K$ scaler 44 in FIG. 2. During the succeeding time channel the number K is therefore stored in the multichannel analyzer.

Thus, during successive sweeps, the number of pulses $C_j$ in each time channel $j$ of a sweep, except time channel one, is compared with the number $A-K$ generated during the preceding sweep. If the number of pulses $C_j$ in a time channel $j$ is within the limits $A \pm K$, the number $C_j-(A-K)$ is stored in the multichannel analyzer. If the number of pulses $C_j$ in a time channel is not within the limits $A \pm K$, the number $A-(A-K)$, or simply K, is stored in the multichannel analyzer. Since in either case the number actually stored in the multichannel analyzer is reduced by $(A-K)$, the effective capacity of the analyzer is increased. The digital filter as described in the foregoing therefore recognizes and suppresses fluctuations in successive trains of data pulses which are outside of predetermined limits.

While the multichannel storage device 10 in FIG. 1 has been described as a multichannel analyzer, the multichannel analyzer is not used to classify the pulse height of the input pulses but is used in the time mode only as described in the U.S. Pat. No. 3,087,487 referred to hereinbefore.

Persons skilled in the art will, of course, readily adapt the general teachings of the invention to embodiments other than the specific embodiment illustrated. Accordingly the scope of the protection afforded the invention should not be limited to the particular embodiment shown in the drawings and described above, but shall be determined only in accordance with the appended claims.

The embodiments of the invention in which an exclusive property or privilege is claimed are defined as follows:

1. In a multichannel digital averaging system wherein recurring trains of pulses are each divided into a number of consecutive equal time channels, and the number of pulses occurring in each time channel are recorded and cumulated in corresponding memory channels of a multichannel analyzer, the improvement comprising digital filter means interposed between the source of said pulses and said multichannel analyzer for operating on and modifying said pulses before transmitting same to said multichannel analyzer, said digital filter means comprising:

means for dividing the number of pulses in each of said train of pulses by the number of said time channels to produce an output representative of the average number of pulses per channel for each train of pulses;

subtracting means receiving said trains of pulses and the output of said dividing means for producing an output representative of the absolute magnitude of the difference between the said average number of pulses per channel in a train of pulses and the number of pulses in each channel of the succeeding train of pulses, and means receiving the output of said subtracting means for generating responsive thereto, for each channel, a modified number of pulses for transmission to said multichannel analyzer, said modified member of pulses being equal to the sum of a predetermined constant and said difference whenever said absolute difference is smaller than said predetermined constant and being equal to said predetermined constant whenever said absolute difference is equal to or larger than said predetermined constant.

2. In a multichannel digital averaging system wherein recurring trains of pulses are each divided into a number of consecutive equal time channels, and the number of pulses occurring in each time channel are recorded and cumulated in corresponding memory channels of a multichannel analyzer, the improvement comprising digital filter means interposed between the source of said pulses and said multichannel analyzer for operating on and modifying said pulses before transmitting same to said multichannel analyzer, said digital filter means comprising:

first binary counter means, including an output representative of the binary number therein and having an initial count equal to a predetermined number $-K$, representative of a predetermined acceptable deviation from an average number, A, of pulses per time channel;

a scaler circuit receiving each of said trains of pulses and dividing by a number equal to the total number of channels, thereby generating said average number A, and for transferring the resulting value for A to said first binary counter means to accumulate therein a number representative of the value of $A-K$;

means including a binary register receiving the output of said first binary counter means for storing said output representative of said value $A-K$, and for generating therefrom an output representative of the binary complement of said value of $A-K$;

second binary counter means receiving the output of said binary complement generating means for storing the binary complement of said value of $A-K$ at the begining of each time channel, and connected to said source of pulses to receive said trains of pulses for counting the number, $C_j$, of pulses during each time channel $j$, to produce an output representative of the number $C_j-(A-K)$ during each time channel;

comparison means including an output and receiving the output of said second binary counter means for producing a first output signal when said number $C_j-(A-K)$ lies between zero and 2K and for producing a second output signal when said number $C_j-(A-K)$ does not lie between zero and 2K; and means receiving the first and second outputs of said comparison means for generating for each channel a first and second modified number of pulses for transmission to said multichannel analyzer in response to said first and second output signals, respectively, said first modified number of pulses being equal to $C_j-(A-K)$ whenever $C_j-(A-K)$ lies between zero and 2K, and said second modified number of pulses being equal to K whenever $C_j-(A-K)$ does not lie between zero and 2K.

References Cited

UNITED STATES PATENTS

| | | | |
|---|---|---|---|
| 3,182,181 | 5/1965 | Schumann | 235—164 |
| 3,087,487 | 4/1963 | Clynes | 128—2.1 |
| 3,374,435 | 3/1968 | Engel | 328—165 |
| 3,177,349 | 4/1965 | Zaborszky et al. | 235—152 |

EUGENE G. BOTZ, Primary Examiner

D. H. MALZAHN, Assistant Examiner

U.S. Cl. X.R.

235—156; 328—165